(12) United States Patent
Sturt et al.

(10) Patent No.: US 12,488,646 B2
(45) Date of Patent: Dec. 2, 2025

(54) SINGLE-BALLOT LOGIC AND ACCURACY TESTING

(71) Applicants: REGENTS OF THE UNIVERSITY OF MICHIGAN, Ann Arbor, MI (US); The Board of Trustees of the University of Illinois, Urbana, IL (US)

(72) Inventors: Bradley Sturt, Urbana, IL (US); John Alexander Halderman, Ann Arbor, MI (US); Braden L. Crimmins, Ann Arbor, MI (US)

(73) Assignees: REGENTS OF THE UNIVERSITY OF MICHIGAN, Ann Arbor, MI (US); The Board of Trustees of the University of Illinois, Urbana, IL (US)

( * ) Notice: Subject to any disclaimer, the term of this patent is extended or adjusted under 35 U.S.C. 154(b) by 0 days.

(21) Appl. No.: 18/905,050

(22) Filed: Oct. 2, 2024

(65) Prior Publication Data
US 2025/0111724 A1   Apr. 3, 2025

Related U.S. Application Data

(60) Provisional application No. 63/541,924, filed on Oct. 2, 2023.

(51) Int. Cl.
*G07C 13/00* (2006.01)
*G07C 13/02* (2006.01)
*H04L 9/06* (2006.01)
*H04N 1/107* (2006.01)

(52) U.S. Cl.
CPC ............ *G07C 13/02* (2013.01); *H04L 9/0643* (2013.01); *H04N 1/1074* (2013.01)

(58) Field of Classification Search
CPC ....... G07C 13/02; G07C 13/00; H04L 9/0643; H04N 1/1074
See application file for complete search history.

(56) References Cited

U.S. PATENT DOCUMENTS

| | | | | |
|---|---|---|---|---|
| 8,864,026 B2 * | 10/2014 | Coomer | ................ | G07C 13/00 235/386 |
| 8,996,416 B2 * | 3/2015 | Flynn | .................... | G06Q 30/04 705/30 |
| 9,300,925 B1 * | 3/2016 | Zhang | .................... | G06V 20/52 |
| 11,080,959 B1 | 8/2021 | Gonzalez | | |
| 11,210,543 B1 * | 12/2021 | Wagner | ................... | G06F 16/58 |

(Continued)

FOREIGN PATENT DOCUMENTS

EP   3751526 B1 *   5/2024   ........... G07D 7/0034

*Primary Examiner* — Tuyen K Vo
(74) *Attorney, Agent, or Firm* — MARSHALL, GERSTEIN & BORUN LLP

(57) ABSTRACT

The following relates generally to error detection in voting systems, and, in particular voting systems using optical scan machines. In some embodiments, one or more processors are configured to: (1) capture, with an optical scan machine, original image data; (2) isolate a first subimage of the original image data; (3) associate the first subimage with a first configuration file candidate, wherein the first configuration file candidate is indicated by a configuration file configuring the optical scan machine, and wherein the association is done according to the configuration file; and (4) display the first subimage along with a representation of the first configuration file candidate.

20 Claims, 6 Drawing Sheets

(56) References Cited

U.S. PATENT DOCUMENTS

| | | |
|---|---|---|
| 11,544,945 B2 * | 1/2023 | Nepomniachtchi ........ G07C 9/00 |
| 11,711,383 B2 | 7/2023 | Deardorff et al. |
| 2003/0062411 A1 | 4/2003 | Chung et al. |
| 2007/0040027 A1 | 2/2007 | Morales |
| 2014/0263637 A1 * | 9/2014 | Roger ................ H04N 1/00371 |
| | | 235/386 |
| 2015/0039403 A1 * | 2/2015 | Grossberg .............. G07C 13/00 |
| | | 705/12 |
| 2016/0284150 A1 | 9/2016 | DeLongchamp |
| 2018/0350180 A1 * | 12/2018 | Onischuk ................ G07C 13/00 |
| 2019/0213820 A1 * | 7/2019 | Sebes ..................... G07C 13/00 |
| 2020/0160640 A1 | 5/2020 | Ruskin |
| 2020/0242872 A1 * | 7/2020 | Deutsch ............. G06F 16/9035 |
| 2021/0150542 A1 | 5/2021 | Loyd |
| 2021/0358253 A1 | 11/2021 | White |
| 2022/0101046 A1 | 3/2022 | Lin et al. |
| 2022/0156758 A1 * | 5/2022 | Loyd ........................ H04L 9/50 |

* cited by examiner

SINGLE-BALLOT LOGIC AND ACCURACY TESTING

CROSS-REFERENCE TO RELATED APPLICATIONS

The application claims priority to U.S. Provisional Application No. 63/541,924, filed Oct. 2, 2023, which is incorporated herein by reference in its entirety.

STATEMENT OF GOVERNMENT INTEREST

This invention was made with government support under 1518888 awarded by the National Science Foundation. The government has certain rights in the invention.

BACKGROUND

When an optical scan voting machine is working properly, the voting machine may be fed filled-out ballots, and, when voting is complete, will print out the correct number of votes that were cast for each candidate based on the ballots that were fed into the machine. For example, a properly operating optical scan voting machine will report a total number of votes for candidate A equal to the number of ballots fed through the machine which the voter had marked for candidate A.

However, various errors may occur in the voting system due to either intentional manipulation (e.g., a bad actor hacking the voting system, etc.), or unintentional human error (e.g., an unintentional human error in computer programming, etc.). For example, the optical scan voting machine may search the wrong area of the ballot for shading to determine whether a voter marked a vote for a given candidate. In one such example, when searching for votes for candidate A, an optical scan voting machine may mistakenly search for shading in the box next to candidate B, thereby effectively sending votes intended for candidate B to candidate A. In another example, when searching for votes for candidate A, the optical scan voting machine may search an area of the ballot that does not correspond to any voting boxes (e.g., a blank area of the ballot), thereby effectively reducing or eliminating the votes counted for candidate A. In each of these examples, the optical scan voting machine attempts to perform accurate image analysis looking for shading, as the machine should, but whether by intentional manipulation, optical misalignment, or other technical problems, the machine searches the wrong region of the ballot and thus mistakenly identifies shading or mistakenly misses shading.

The systems and methods disclosed herein provide solutions to these problems and others.

SUMMARY

The following relates generally to error detection for optical scan voting machines.

In one aspect, a computer-implemented method for error detection may be provided. The method may include: (1) capturing, with an optical scan machine, original image data; (2) isolating, via one or more processors of the optical scan machine, a first subimage of the original image data; (3) associating, via the one or more processors, the first subimage with a first configuration file candidate, wherein the first configuration file candidate is indicated by a configuration file configuring the optical scan machine, and wherein the associating is done according to the configuration file; and (4) displaying, via the one or more processors, the first subimage along with a representation of the first configuration file candidate.

In another aspect a system for error detection may be provided. The system may include: one or more processors; and one or more memories. The one or more memories may have stored thereon computer-executable instructions that, when executed by the one or more processors, cause the system to: (1) capture, with an optical scan machine, original image data; (2) isolate a first subimage of the original image data; (3) associate the first subimage with a first configuration file candidate, wherein the first configuration file candidate is indicated by a configuration file configuring the optical scan machine, and wherein the association is done according to the configuration file; and (4) print the first subimage along with a representation of the first configuration file candidate.

In yet another aspect, a computer system for error detection may be provided. The system may include or more processors configured to: (1) capture, with an optical scan machine, original image data; (2) isolate a first subimage of the original image data; (3) associate the first subimage with a first configuration file candidate, wherein the first configuration file candidate is indicated by a configuration file configuring the optical scan machine, and wherein the association is done according to the configuration file; and (4) display the first subimage along with a representation of the first configuration file candidate.

Figure 1:
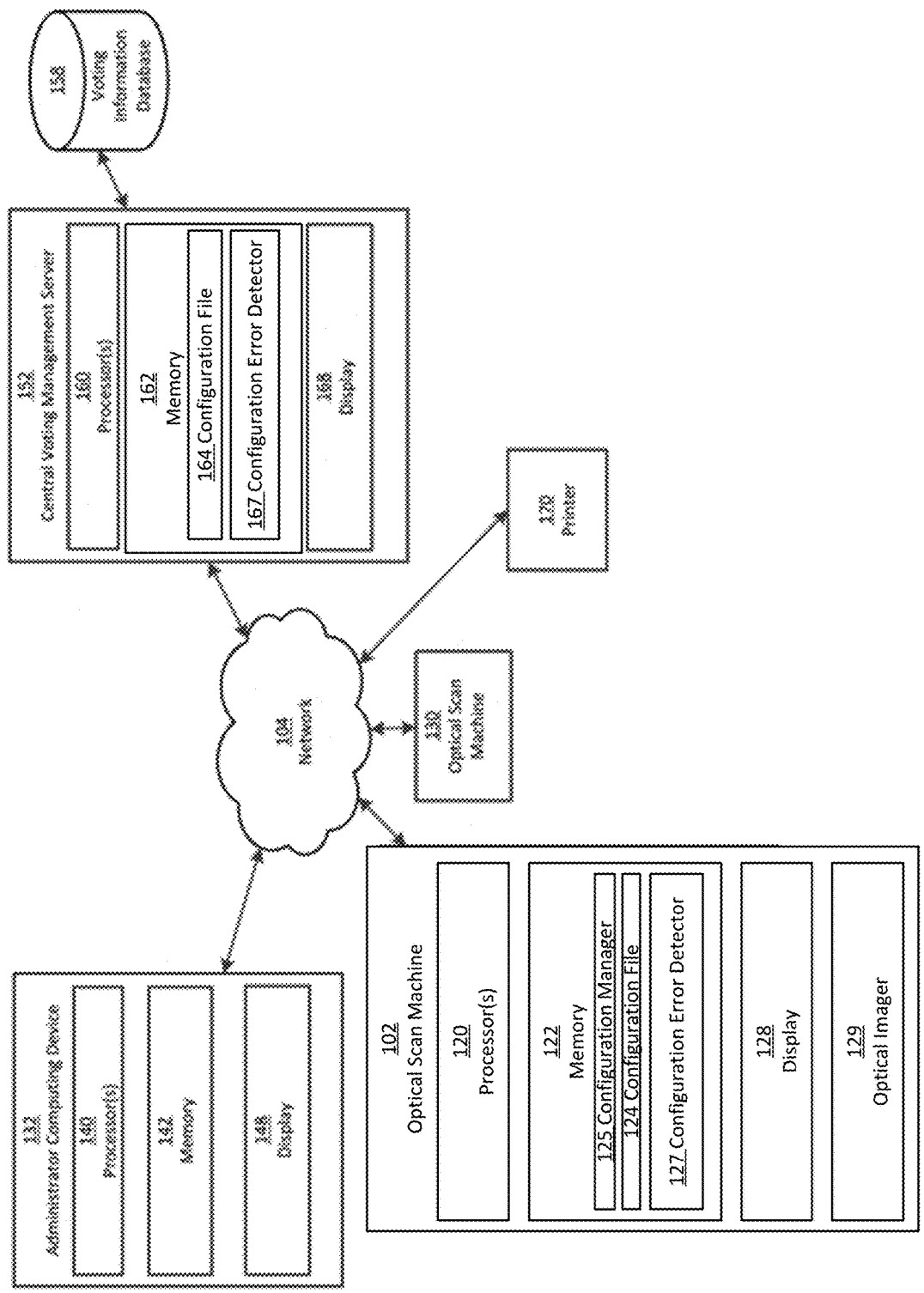
FIG. 1 shows a system for error detection, in an example.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

DETAILED DESCRIPTION

Various errors may occur in optical scan machines used in voting systems. For example, the optical scan machine may search the wrong area of the ballot for shading. In one such example, when searching for votes for candidate A, the optical scan voting machine may search the box next to candidate B, thereby effectively sending votes intended for candidate B to candidate A. In another example, when searching for votes for candidate A, the optical scan voting machine may search an area of the ballot that does not correspond to any voting boxes (e.g., a blank area of the ballot), thereby effectively reducing or eliminating the votes counted for candidate A. Errors such as these may occur due to any cause. For example, an incorrectly programmed configuration file on the optical scan machine may cause the optical scan machine to search the wrong area for the shading.

To solve these problems, some embodiments described herein propose a solution that checks the voting system including the optical scan machine for errors. The proposed solutions may be used at any point in time (e.g., before, during, or after votes are cast, etc.). One such exemplary solution, by way of broad overview, begins with the blank ballot 210 of FIG. 2. A human or machine may start with the blank ballot 210, and may mark a symbol in one or more target areas 222, 224 to create the example marked ballot 220. In the illustrated example, target area 222, which corresponds to candidate Washington, has been marked with the symbol "Y;" and target area 224, which corresponds to candidate Lincoln, has been marked with the symbol "Z." The marked ballot 220 may then be fed into the optical scan machine, and the optical scan machine may then capture original image data of the marked ballot, and isolate subimages within the original image data (e.g., isolate the subimages according to a configuration file, etc.). For example, a configuration file fed to the optical scan machine may indicate predetermined location(s), respectively, of an expected ballot checkbox that the optical scan machine isolates subimage(s) according to. The optical scan machine may then associate the subimages it generates with candidates according to the configuration file. For instance, based upon a predetermined location in a configuration file, a subimage may be connected with (e.g., associated with) a candidate, and the connection may be stored in a memory. Then, the subimages may be displayed and/or printed along with their associated candidates, thereby allowing a human or machine to verify the accuracy of the optical scan machine. For example, a display screen or printed representation 230 may be produced depicting subimage 232 and subimage 234. In the illustrated example, the subimage 232 has been associated with candidate Washington (e.g., a connection between the subimage 232 and Washington has been stored in a memory), and subimage 234 has been associated with candidate Lincoln (e.g., a connection between the subimage 234 and Lincon has been stored in a memory). Furthermore, the symbol "Y" is displayed correctly in the subimage 232 next to the name Washington, but the symbol "Z" is missing from the subimage 234 next to the name Lincoln. Thus, in this example, it is seen that there is an error with respect to candidate Lincoln.

In addition, the techniques described herein have technical advantages over prior systems for detecting errors in voting systems. For example, techniques described herein use only a single test ballot, whereas prior systems required multiple test ballots. In another example, a configuration file configuring the optical scan machine may be controlling the optical scan machine to search the wrong area of a ballot for shading, and, in this example, the systems disclosed herein are able to determine that there is an error with the configuration file. In yet another example, the configuration file may cause the optical scan machine to search an area that is partially shifted away from the target area. Because some voting systems only count votes for a candidate if an average darkness of a target area is above a threshold (or if a certain percentage of a target area is shaded), this partial shift may reduce a number of the votes counted for an intended candidate. Such errors may be difficult to detect using prior systems for detecting errors in voting systems, which report only the total number of votes received by each candidate and do not grant insight into what the machine "sees." The techniques disclosed herein solve these technical problems and others, since they provide greater amounts of information about the machine's function to the test administrator.

Example System

FIG. 1 illustrates an example system 100 for error detection. The system 100 includes optical scan machines 102, 130 which may be tested for errors according to the techniques described herein.

The optical scan machine 102 includes an optical imager 129, such as a camera, a scanner, etc. The optical scan machine 102 further includes one or more processors 120, which may represent a CPU-type processing unit(s), a GPU-type processing unit(s), a field-programmable gate array (FPGA), another class of digital signal processor (DSP), or other hardware logic components that can be driven by a CPU. The optical scan machine 102 further includes memory 122, which may include executable computer-readable code stored thereon for programming a computer (e.g., comprising a processor(s) and GPU(s)) to the techniques herein. Examples of such computer-readable storage media include a hard disk, a solid state storage device/media, a CD-ROM, digital versatile disks (DVDs), an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. The memory 122 may also contain configuration file 124 and an executable configuration manager 125. The optical scan machine 102 may also include a display 128.

In various examples, a configuration file, such as file 124, is used to configure an optical scan machine for ballot voting operation. For example, configuration files are used to configure optical scan machines behavior to perform the particular needs of an election. These files may contain information essential to configure that optical scan machine for proper vote scanning and recording, preventing errors, ensuring accuracy and security, and vote tallying, for example. Configuration files may be structured files that contain information such as ballot layout definition, such as race information, ballot layout such as coordinates of the ovals or other marking areas on the paper ballot that correspond to specific selections, including which positions on the ballot correspond to which candidates or choices, and ballot style information where for example, some districts have different ballot styles (e.g., depending on the voter's precinct). Further configuration files may contain vote counting rules, such as the maximum number of selections a voter can make in each race. In addition to voting-specific parameters, configuration files can have counting definitions for overvote and undervote handling, for example, defining how an optical scan machine should respond if a voter selects too many options in a race (overvote) or too few (undervote). The configuration file may contain instructions for handling straight-ticket voting, for example, where an election allows for straight-party voting, the configuration file may instruct the machine how to account for this and adjust how the machine interprets and counts these votes. Configuration files may contain election parameters, such as date and time, location, precinct information, language settings, etc. or other metadata about the election. Configuration files may contain data on security and access control, such as encryption and authentication keys to help prevent unauthorized tampering with the machine or its stored vote data. Configuration files may contain a listing of authorized users, e.g., specifying who can operate or interact with the machine during setup, testing, and the election itself (e.g., election officials, technicians). Further information that may be contained in a configuration file includes error handling and reporting instructions. These may include error codes and logs of events such as unreadable ballots, machine malfunctions, or tampering attempts. This further information may include thresholds for ballot rejection. Configuration files may contain data output specifications, for example, that establish a vote storage format and results reporting, including the format of printed/digital reporting. Configuration files may include audit trail configuration settings that instruct how to generate and store audit logs, as well as verification settings on matching vote count matches with physical ballots, such as by including hash values or other data integrity checks. Further, these configuration files may contain test and calibration settings for running rest ballots through the optical scan machine to verify its accuracy and calibration before actual voting begins. In particular, as discussed in various examples herein, optical scan machines rely on precise alignment for reading marks on ballots, and the configuration file can include calibration data to ensure the scanning is accurate.

The configuration files herein may store, in a structured manner, any of the foregoing or other data and such data may be parsed by a configuration manger that configures an optical scan machine in accordance with techniques herein.

Advantageously, in various implementations of the present techniques, the configuration manager 125 accesses the configuration file 124 and manages configuring the optical scan machine 102 for everything specific to a particular election. For example, the configuration manager 125 may, in accordance with the configuration file 124, specify the process by which the optical scan machine 102 takes a location on the ballot and checks whether it is marked. The configuration file indicates to the optical scan machine 102 which locations on a ballot (i.e., on capture images from optical imager 129) to look at for a particular year's ballot, the details of the candidates associated with those locations, and how many of the targets the voter is allowed to fill in for a particular contest.

Using configuration file based setup, voting officials do not have to executed different software on each optical scan machine, in different jurisdictions or update these machines every time the candidates in an election changes. Instead, a central computing system, such as a central voting management server 152, may create a new configuration file and communicate that new configuration file to each optical scan machine.

While example configuration files are described herein, different optical scan machines may utilize different configuration files. For example, different optical scan machines may contain different options and have different capabilities and thus may receive and configure on configuration files containing different data/instructions than other configuration files.

In any case, in various examples herein, the configuration file 124 at the optical scan machine 102 may be received from the central voting management server 152, in the form of a configuration file 164 generated and/or stored therein.

As discussed in various examples herein, the configuration file 124/164 may indicate predetermined location(s), respectively, of expected ballot checkboxes that the optical scan machine 102 isolates the subimage(s) according to. In this regard, the predetermined location may be a location within an image, or a location within a physical ballot. Furthermore, the configuration file 124, 164 may include names of candidates, contests that the candidates are running in (e.g., president contest; senate contest; etc.).

Further, in various examples herein, the configuration file 124 may contain associations between target areas of the ballot and candidates (e.g., an association between target area 222, and candidate Washington). In this way, if there is an error in the configuration file, it may cause problems in correctly counting votes. For instance, as discussed above with respect to the example of FIG. 2, there is an error because symbol "Z" is missing from the subimage 234 next to the name Lincoln in display 230. Thus, a human or computer may determine that there is an error in the configuration file by viewing and/or analyzing the display 230. Furthermore, the configuration file 124 may be a target for a bad actor. To detect against configuration file errors, in various examples herein the optical scan machine 102 contains a configuration error detector 127. In various other examples, the central voting management server 152 contains a configuration error detector 167. The configuration error detector 127/167 may be configured to implement various methods herein, such as those of FIGS. 3 and 5.

The example system 100 may also include optical scan machine 130 (e.g., a second optical scan machine). The optical scan machine may include similar components to the optical scan machine 102 (e.g., one or more processors, memory, configuration file, display, etc.).

The example system 100 may also include administrator computing device 132. The administrator computing device 132 may be any suitable device, such as a laptop, a personal computer, a mobile phone, a tablet, a phablet, etc. In some implementations, an administrator uses the administrator computing device 132 to view a display produced according to the techniques described herein (e.g., a display including sub images associated with candidates), such as example display 230.

The administrator computing device 132 includes one or more processors 140, which may represent a CPU-type processing unit(s), a GPU-type processing unit(s), a field-programmable gate array (FPGA), another class of digital signal processor (DSP), or other hardware logic components that can be driven by a CPU. The administrator computing device 132 further includes memory 142, which may include executable computer-readable code stored thereon for programming a computer (e.g., comprising a processor(s) and GPU(s)) to the techniques herein. Examples of such computer-readable storage media include a hard disk, a solid state storage device/media, a CD-ROM, digital versatile disks (DVDs), an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. The administrator computing device 132 may also include a display 148.

The example system 100 may also include the central voting management server 152. In some implementations, the central voting management server 152 collects and counts votes and/or optical scans of ballots from optical scan machines (and any other types of voting machines in the system), such as the optical scan machines 102, 130. To this end, the central voting management server 152 may use voting machine information database 158 to store information of elections (e.g., configuration files, cryptographic hashes of configuration files, vote count totals, information of elections, etc.).

The central voting management server 152 includes one or more processors 160, which may represent a CPU-type processing unit(s), a GPU-type processing unit(s), a field-programmable gate array (FPGA), another class of digital signal processor (DSP), or other hardware logic components that can be driven by a CPU. The central voting management server 152 further includes memory 162, which may include executable computer-readable code stored thereon for programming a computer (e.g., comprising a processor(s) and GPU(s)) to the techniques herein. Examples of such computer-readable storage media include a hard disk, a solid state storage device/media, a CD-ROM, digital versatile disks (DVDs), an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. The memory 122 may also hold configuration file 164, which may be communicated to each of the optical scan machines connected to the central server 152. Further, while one configuration file 164 is shown that may represent multiple different configuration files each differing based on the election, the candidates, the location, the optical scan machine type, etc. The central voting management server 152 may also include a display 168.

In various examples herein, the configuration file 164 may contain associations between target areas of the ballot and candidates (e.g., an association between target area 222, and candidate Washington). In this way, if there is an error in the configuration file, it may cause problems in correctly counting votes. Further in this way, configuration files may be targets for bad actors.

The system 100 may also include printer 170, which may print printed representations, such as printed representation 230. The printer 170 may also print other items, such as blank ballots (e.g., blank ballot 210, etc.), poll tapes, etc.

Moreover, the illustrated exemplary components may be configured to communicate, e.g., via a network 104 (which may be a wired or wireless network, such as the internet), with any other component. In various examples, the network 104 represents a secured, physical communication link between devices. For example, data may preferably be transferred to and from an optical scan machine/server/administrator computing device using flash drives, removable memory cards, or other physical computer accessible storage media. Therefore, references herein to network, which wired or wireless, are intended to include such physical storage media used for moving secured data between computing devices.

In addition, although the example system 100 illustrates only one or two of many of the components, any number of components are contemplated (e.g., any number of optical scan machines, administrator computing devices, central voting management servers, printers, voting information databases, etc.).

Example Methods

Figure 3:
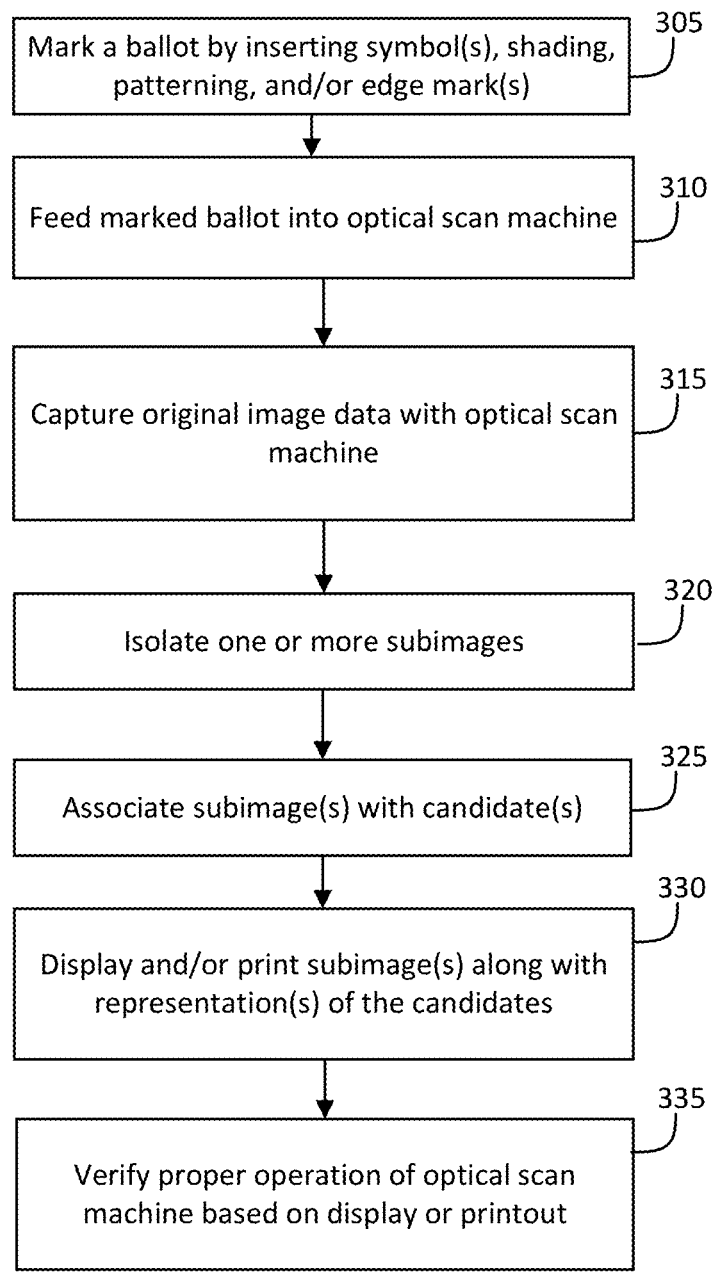
FIG. 3 illustrates an example of a flowchart of a method for error detection in a voting system.

FIG. 3 illustrates an example flowchart 300 of a method for error detection in a voting system, such as the optical scan machine 102. The method illustrated in flowchart 300 may occur after the configuration manager 125 has configured the optical scan machine 102 based on the configuration 124. The various processes described in in reference to flowchart 300 may be implemented by one or both of the optical scan machine 102 and the central voting management server 152, for example by the configuration error detector 127 and/or the configuration error detector 167.

The example method begins at block 305 when a ballot is marked by inserting a symbol, shading, patterning, and/or edge mark. The marking may be done by a human and/or machine. For example, a human may mark a paper ballot. Additionally or alternatively, a machine (possibly as instructed by a human) may electronically mark an electronic ballot. The ballot may be marked in any area (e.g., a target area 222, 224, or any other area, etc.).

Any symbols may be used. Examples of the symbols include alphanumeric characters, text, pictures, drawings, squiggle marks, etc. In some embodiments, it is advantageous to use a human-readable symbol (e.g., an alphanumeric character, or a picture that a human would recognize) because this allows a human to quickly verify proper operation of the optical scan machine (e.g., subsequently at block 335, etc.).

Figure 4B:
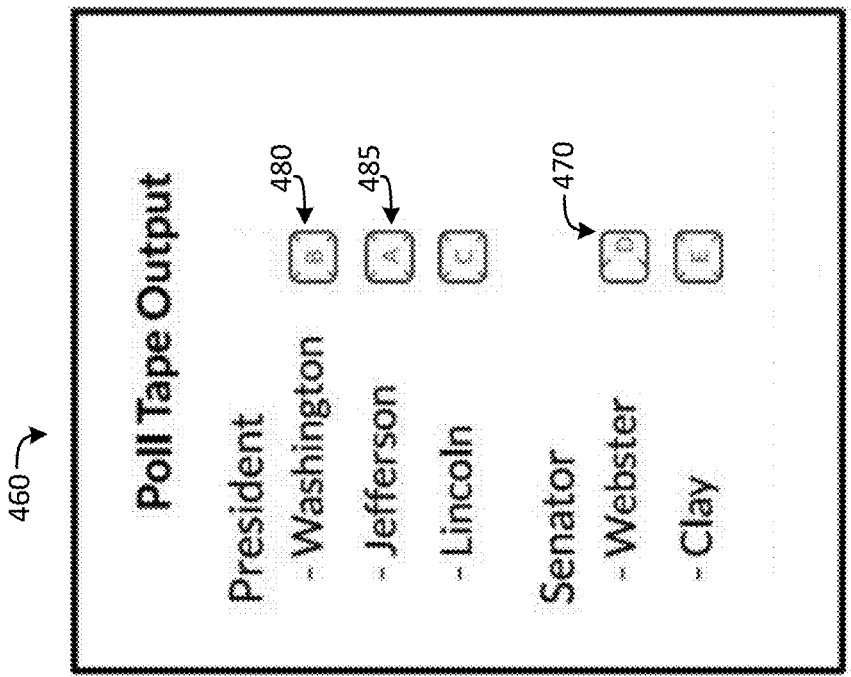
FIG. 4B illustrates an example poll tape output corresponding to the example ballot of FIG. 4A, and containing errors.
Figure 4A:
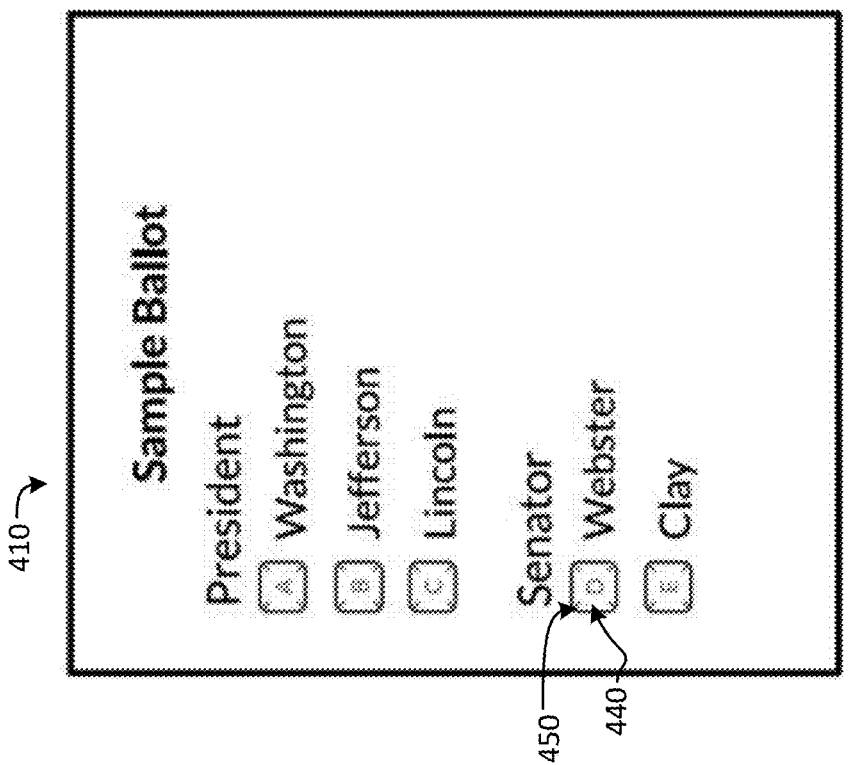
FIG. 4A illustrates an example ballot marked with an edge mark.

An example of an edge mark 450 is illustrated in the target area 440 (e.g., the box corresponding to Webster) of the example ballot 410 of the example of FIG. 4A. For example, the ballot 410 may be marked with one or more edge marks 450 in corners of the box 440, as illustrated in the example of FIG. 4A. As will be seen, marking a target area 440 with an edge mark 450 advantageously allows the alignment of the optical scan machine 102 to be checked (e.g., check an alignment error). For example, the configuration file 124, 164 may (either because of inadvertent error or bad acting) may cause capture of a subimage that is partially shifted away from the target area 440. FIG. 4B depicts an example of this. More particularly, FIG. 4B shows an example poll tape output 460 (e.g., display screen or printout) corresponding to the example ballot 410 with a subimage 470 that has shifted. Because some voting systems only count votes for a candidate if an average darkness of a target area is above a threshold (or if a certain percentage of a target area is shaded), this partial shift may reduce a number of the votes counted for an intended candidate. Thus, use of such an edge mark advantageously improves the technical functioning of the error detection system.

In addition, FIG. 4B illustrates a further error as well. Namely, FIG. 4B illustrates that the subimage corresponding to Washington (e.g., the box including an "A") and the subimage corresponding to Jefferson (e.g., the box including an "A") have been swapped, as shown by boxes 480, 485. Thus, a human or computer may determine that there is an error because the symbols in the subimages have been swapped. Moreover, it should further be appreciated that a human or computer could determine other errors besides swapping. For instance, if any other symbol besides "A" appeared in box 480, the human or computer is able to determine that there is an error.

At block 310, the marked ballot is fed into the optical scan machine 102.

At block 315, the optical scan machine 102 (e.g., via the one or more processors 120) captures original image data (e.g., via the optical imager 129) of the ballot that has been fed into it. The original image data may be from still captured image data or video data such as formed of a plurality of image data captured in sequence.

At block 320, the optical scan machine 102 (e.g., via the one or more processors 120) isolates one or more subimages within the original image data. For example, the configuration file 124, 164 may indicate predetermined location(s), respectively, of expected ballot checkboxes that the optical scan machine 102 isolates the subimage(s) according to. The configuration manager 125 may have configured the optical imager 129 to captured and analyze images according to the configuration file 124, during configuration setup of the optical scan machine 102, for example.

Additionally or alternatively, the isolating at block 320 may occur by the optical scan machine 102: first, identifying candidate(s) name location(s) in the original image data (e.g., via optical character recognition (OCR), etc.); second, determining location(s) of the subimage(s) based on the candidate(s) name location(s) (e.g., the locations of the subimages may be determined to be preset horizontal distances from the candidate name locations); and third, isolating the subimage(s) based on the determined location(s) of the subimage(s).

At block 325, the optical scan machine 102 (e.g., via the one or more processors 120) associates the subimage(s) with candidate(s). For instance, with respect to the example of FIG. 2, subimage 232 may be associated with candidate Washington, and subimage 234 may be associated with candidate Lincoln. The association may be done according to the configuration file 124 (e.g., the configuration file 124 has been programmed with associations between subimages and candidates). Such image analysis and associations may be performed at the configuration error detector 127 in response to image data captured by the optical imager 129, for example.

Additionally or alternatively, in some embodiments, the subimages may be uploaded to the central voting management server 152, and the association may be one according to the configuration file 164, rather than the configuration file 124. In some such examples, the configuration error detector 167 at the server 152 may analyze the subimages received from the optical scan machine 102, and the associations may be performed at the server 152.

Figure 2:
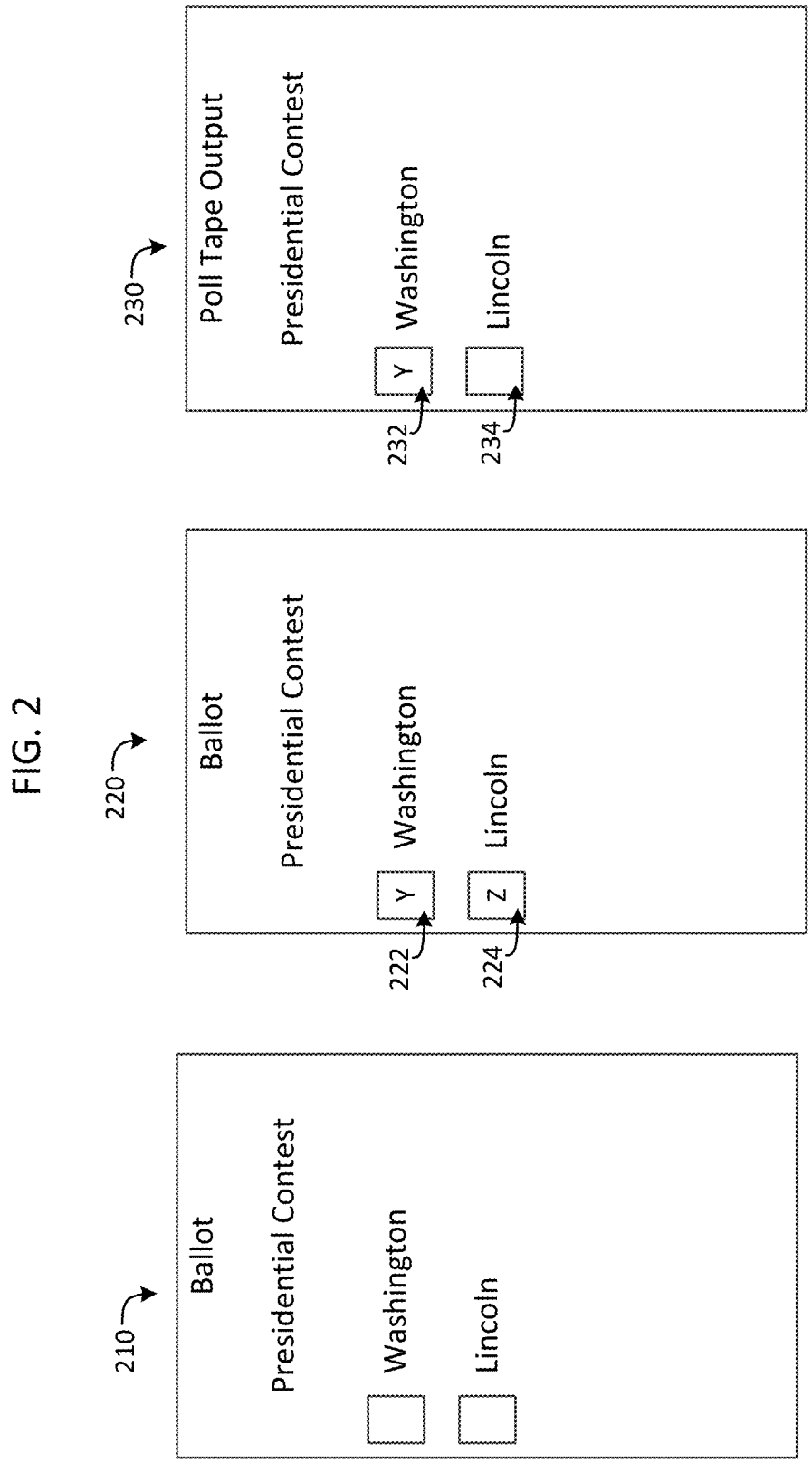
FIG. 2 illustrates an example blank ballot, an example marked ballot, and an example display and/or printout depicting associations between subimages and candidates.

At block 330, the subimage(s) along with the respective representation(s) of the associated candidates are displayed (e.g., at any of the displays 128, 148, 168, and/or a display of the optical scan machine 130), and/or printed (e.g., by the printer 170), such as illustrated by the example display screen or printed representation 230 of the example of FIG. 2.

At block 335, proper operation of the optical scan machine 102 may be verified. For example, a human may visually compare the display or printout created at block 330 to the marked ballot created at block 305 to determine proper operation of the optical scan machine 102 and/or proper programing of the configuration file 124, 164. Additionally or alternatively, a machine may accomplish the verification of the proper operation of the voting machine (e.g., by using an algorithm to compare visual images, etc.), for example, using the configuration error detector 127 or the configuration error detector 167, for examples where error detection is at least partially determined at the server 152.

Further advantageously, if the optical scan machine 102 is not operating properly, the nature of the error may be determined, for example, by the configuration error detector 127/167. For instance, in the example of FIG. 2, if a "Y" had appeared in the subimage 234, it would be known that optical scan machine 102 (e.g., possibly because of an error in the configuration file 124) was erroneously searching for votes for Lincoln in the target area 222. In this regard, it is advantageous to use different symbols for different candidates (e.g., different symbols in target areas 222 and 224) so that a swap of target areas is easily discernible. This also demonstrates a further advantage over prior systems because prior systems did not indicate the nature of the error. For example, prior error detection systems may indicate that the voting system had an error, but did not indicate the nature of the error (e.g., indicate votes between which candidates were being swapped, etc.).

While examples above describe image-based configuration error detection, the present techniques allow for other techniques for assessing configuration file errors.

Figure 5:
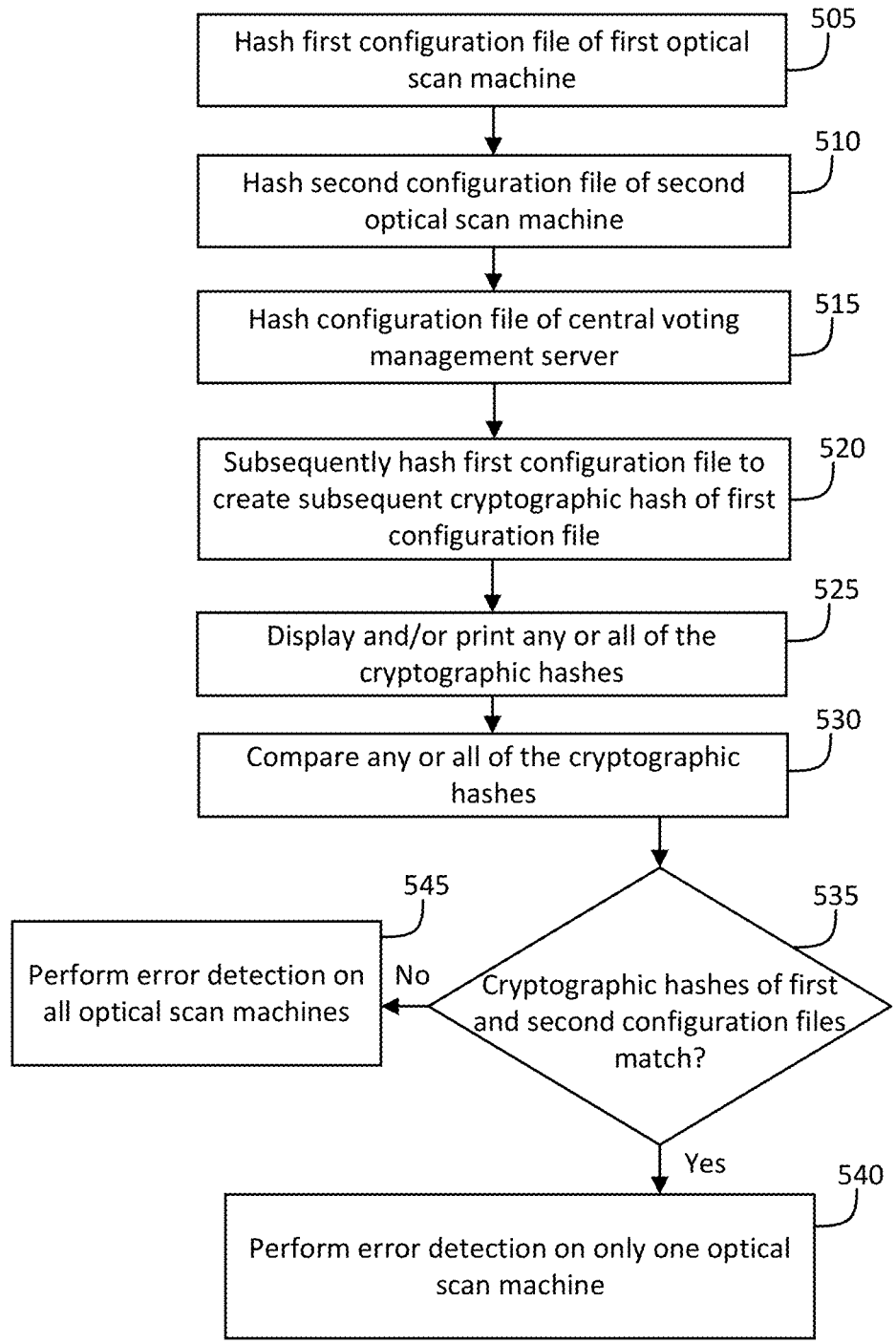
FIG. 5 illustrates an example flowchart of a method for error detection in a voting system, including hashing configuration files.

FIG. 5 illustrates an example flowchart 500 of a method for error detection in a voting system, by performing a hashing-based analysis of configuration files. Advantageously, comparing cryptographic hashes of configuration files demonstrates if the configuration files are the same or different. The comparisons may be applied for "time" (e.g., an initial cryptographic hash of a configuration file of an optical scan machine is compared with a subsequent cryptographic hash of the configuration file of the same optical scan machine to determine if tampering has occurred in the time period between when the cryptographic hashes were taken), and/or "space" (e.g., cryptographic hash of a first configuration file of a first optical scan machine 102 is compared to a cryptographic hash of a second configuration file of a second optical scan machine 130).

In various examples, an analysis of hashes of configuration files described herein may be performed by the configuration error detector 167, by the configuration error detector 127, or some combination of the two. That is, any or all of the blocks of the example method 500 may be performed by any suitable component, such as any or all of the one or more processors 120, the one or more processors 140, the one or more processors 160, one or more processors of the optical scan machine 130, etc.

Further, the example method 300 and the example method 500 may be combined of the two approaches may be implemented independently. That is, while configuration error detectors herein may be applications configured to implement one of the methods, in various examples, the methods may be implemented together by the same configuration error detector. For example, a voting system may perform an image-capture based analysis on a single optical scan machine, and if that machine passes that image-captured based analysis, an administrator may determine the machine is properly configured as a result. Subsequently, however, if the hashing-based analysis compares that optical scan machine's configuration to another machine's configuration, the voting system can check whether those two optical scan machines have been configured in the same way. If they have, the administrator knows the second machine has also been properly configured (see, the flowchart in FIG. 5). Of course, in some examples, the first configuration validation may be from the method 300 or another method, such as through Robust L&A, and the method in FIG. 5 may be implemented to perform such cross-machine error detection as described.

The example method 500 begins at block 505 when a first cryptographic hash of a configuration file 124 configuring the first optical scan machine 102 may be created.

At block 510, a second cryptographic hash of a configuration file configuring the second optical scan machine 130 may be created.

At block 515, a cryptographic hash of a configuration file 164 configuring the central voting management server 152 may be created.

At block 520, a subsequent cryptographic hash of the configuration file 124 configuring the first optical scan machine 102 may be created. In this regard, the cryptographic hash created at block 505 may be an initial cryptographic hash, and the cryptographic hash created at block 520 may be a subsequent cryptographic hash.

The system may also associate time stamp(s) with any of the cryptographic hashes created at blocks 505, 510, 515, and/or 520 (e.g., time stamps indicating when the cryptographic hash was created). The cryptographic hashes and/or time stamps may be stored in any of the memory 122, 142, 162, and/or the voting information database 158.

Figure 6:
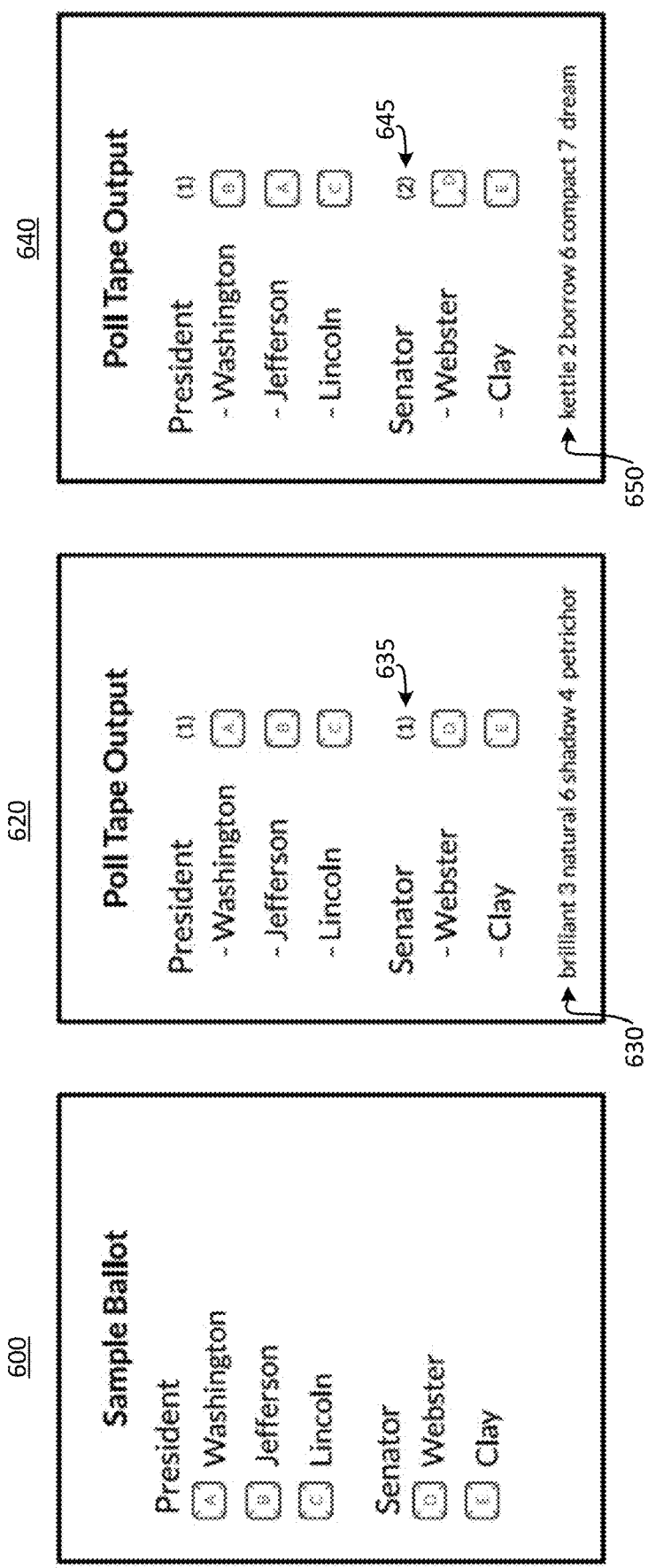
FIG. 6 shows: (i) an example ballot, (ii) an example correct display screen or printout, and (iii) an example incorrect display screen or printout.

At block 525, any or all of the cryptographic hashes created at blocks 505, 510, 515, and/or 520 may be displayed (e.g., at any of the displays 128, 148, 168, and/or a display of the optical scan machine 130), and/or printed (e.g., by the printer 170). In this regard, FIG. 6 shows sample ballot 600, and further shows an example display screen or printout 620 with the correct output corresponding to the sample ballot 600 and including a string 630 representing a cryptographic hash. Advantageously, presenting the cryptographic hash in human-readable form (e.g., as in the example string 630) allows for quick comparison between two cryptographic hashes by a human administering the test.

At block 530, any or all of the cryptographic hashes created at blocks 505, 510, 515, and/or 520 may be compared. This may be done by a human reading a display and/or printout indicating the cryptographic hashes. Additionally or alternatively, the comparison may be done by a computer algorithm, for example, by the configuration error detector 167.

To ensure that there are no errors, generally, the compared hashes should be the same. For example, if the initial cryptographic hash created at block 505 does not match the subsequent cryptographic hash, this indicates that the configuration file has changed in the time period between when the hashing was performed. Furthermore, if the cryptographic hashes of the configuration file 124 (block 505) and the configuration file 164 (block 515) do not match, for example, as determined by the configuration error detector 167, this means that the configuration files 124 and 164 are not the same, which may be an indication that there is an error in one of the configuration files.

In one illustrative example, the cryptographic hashes 630, 650 of the example display screens or printouts 620, 640 do not match, thus indicating that there is an error in a configuration file.

Such information may be leveraged. For example, if it is determined (e.g., at decision block 535) that the configuration file 124 is the same as the configuration file configuring the second optical scan machine 130, the system may save time and resources by performing additional testing on only one of the optical scan machines 102, 130. For instance, if it is determined that the configuration files are the same, additional testing (e.g., such as error determination according to any of the techniques described herein, such as in the example method 300, or according to any other error detecting technique, etc.) may be performed only on optical scan machine 102 but not optical scan machine 130 (block 540). Advantageously, not performing the error detection on all optical scan machines saves time and resources (e.g., not as many images of ballots need to be captured, and processed, etc.).

If a match is not found at decision block 535, error detection may be performed on all optical scan machines (block 545).

In addition, it may be noted that FIG. 6 illustrates another error detection aspect as well, as may be analyzed for by the configuration error detector 167. Namely, verifying the number of allowed votes for each contest. For example, the correct display screen or printout 620 correctly indicates, via number 635, that one vote is allowed in the senate contest. However, the incorrect display screen or printout 640 incorrectly indicates, via number 645, that two votes are allowed in the senate contest. Therefore, a human administrator may infer that there is an error with the configuration file.

It should be understood that not all blocks and/or events of the exemplary signal diagrams and/or flowcharts 300, 500 are required to be performed. Moreover, the exemplary signal diagrams and/or flowcharts 300, 500 are not mutually exclusive (e.g., block(s)/events from each example signal diagram and/or flowchart may be performed in any other signal diagram and/or flowchart). The exemplary signal diagrams and/or flowcharts may include additional, less, or alternate functionality, including that discussed elsewhere herein.

ADDITIONAL EXEMPLARY EMBODIMENTS

Aspect 1. A computer-implemented method for error detection, the method comprising:
   capturing, with an optical scan machine, original image data;
   isolating, via one or more processors of the optical scan machine, a first subimage of the original image data;
   associating, via the one or more processors, the first subimage with a first configuration file candidate, wherein the first configuration file candidate is indicated by a configuration file configuring the optical scan machine, and wherein the associating is done according to the configuration file; and
   displaying, via the one or more processors, the first subimage along with a representation of the first configuration file candidate.

Aspect 2. The computer-implemented method of claim 1, further comprising:
   prior to the capturing of the original image data: (i) marking a ballot with a first symbol in a first target area of the ballot, the first target area corresponding to a first ballot candidate, and (ii) feeding the marked ballot into the optical scan machine; and
   wherein the capturing the original image data comprises capturing the original image data of the marked ballot.

Aspect 3. The computer-implemented method of claim 1, further comprising:
   isolating, via the one or more processors, a second subimage of the original image data;
   associating, via the one or more processors, the second subimage with a second configuration file candidate, wherein the second configuration file candidate is indicated by the configuration file configuring the optical scan machine, and wherein the associating is done according to the configuration file; and
   displaying the second subimage along with a representation of the second configuration file candidate.

Aspect 4. The computer-implemented method of claim 1, wherein the configuration file indicates a predetermined location of an expected ballot checkbox, and wherein the isolating the first subimage comprises isolating the first subimage according to the predetermined location of the expected ballot checkbox.

Aspect 5. The computer-implemented method of claim 1, wherein the isolating the first subimage comprises:
   identifying a first candidate name location in the original image data;
   determining a location of the subimage based on the first candidate name location; and
   isolating the first subimage based upon the determined first candidate name location.

Aspect 6. The computer-implemented method of claim 1, wherein the displaying comprises displaying the first subimage along with a representation of the configuration file candidate on: a display of the optical scan machine, and/or a display of an administrator computing device.

Aspect 7. The computer-implemented method of claim 1, wherein the optical scan machine is a first optical scan machine, and the configuration file is a first configuration file, and wherein the method further comprises:
hashing the first configuration file to create a first cryptographic hash of the first configuration file;
hashing a second configuration file configuring a second optical scan machine to create a second cryptographic hash of the second configuration file; and
comparing the first cryptographic hash of the first configuration file to the second cryptographic hash of the second configuration file.

Aspect 8. The computer-implemented method of claim 7, further comprising:
loading the first cryptographic hash of the first configuration file onto a central voting management server; and
loading the second cryptographic hash of the second configuration file onto the central voting management server; and
wherein the comparing the first cryptographic hash of the first configuration file to the second cryptographic hash of the second configuration file is performed by one or more processors of the central voting management server.

Aspect 9. The computer-implemented method of claim 7, further comprising:
determining that the first configuration file matches the second configuration file based on the comparing the first cryptographic hash of the first configuration file to the second cryptographic hash of the second configuration file; and
in response to the determining that the first configuration file matches the second configuration file, not capturing second original image data with the second optical scan machine.

Aspect 10. The computer-implemented method of claim 1, further comprising:
prior to the capturing the original image data, hashing the first configuration file to create an initial cryptographic hash of the first configuration file;
subsequent to the displaying the first subimage along with a representation of the first configuration file candidate, hashing the first configuration file to create a subsequent cryptographic hash of the first configuration file; and
comparing the initial cryptographic hash to the subsequent cryptographic hash.

Aspect 11. The computer-implemented method of claim 1, wherein the configuration file is an optical scan machine configuration file, and wherein the method further comprises:
hashing the optical scan machine configuration file to create an optical scan machine cryptographic hash of the optical scan machine configuration file;
hashing a central voting management server configuration file configuring a central voting management server to create a central voting management server cryptographic hash of the central voting management server configuration file; and
comparing the optical scan machine cryptographic hash of the optical scan machine configuration file to the central voting management server cryptographic hash of the central voting management server configuration file.

Aspect 12. The computer-implemented method of claim 1, wherein:
the method further comprises, prior to the capturing of the original image data: (i) marking a ballot with at least one edge mark in a first target area of the ballot, the first target area corresponding to a first ballot candidate, and (ii) feeding the marked ballot into the optical scan machine;
the capturing the original image data comprises capturing the original image data of the marked ballot; and
checking an alignment of the optical scan machine based on a representation of the at least one edge mark in the first subimage.

Aspect 13. A system for error detection, the system comprising:
one or more processors; and
one or more memories;
the one or more memories having stored thereon computer-executable instructions that, when executed by the one or more processors, cause the system to:
capture, with an optical scan machine, original image data;
isolate a first subimage of the original image data;
associate the first subimage with a first configuration file candidate, wherein the first configuration file candidate is indicated by a configuration file configuring the optical scan machine, and wherein the association is done according to the configuration file; and
print the first subimage along with a representation of the first configuration file candidate.

Aspect 14. The system of claim 13, wherein:
the one or more processors are one or more processors of an optical scan machine; the system further comprises a printer; and
the one or more memories having stored thereon computer executable instructions that, when executed by the one or more processors, cause the system to print the first subimage along with a representation of the first configuration file candidate by sending printing instructions from the one or more processors to the printer.

Aspect 15. The system of claim 13, wherein the optical scan machine is a first optical scan machine, and the configuration file is a first configuration file, and wherein the one or more memories having stored thereon computer executable instructions that, when executed by the one or more processors, cause the system to:
hash the first configuration file to create a first cryptographic hash of the first configuration file;
hash a second configuration file configuring a second optical scan machine to create a second cryptographic hash of the second configuration file; and
if the first configuration file matches the second configuration file, not capture second original image data with the second optical scan machine.

Aspect 16. The system of claim 13, further comprising a central voting management server, and wherein the one or more memories having stored thereon computer executable instructions that, when executed by the one or more processors, cause the system to:
hash the first configuration file to create a first cryptographic hash of the first configuration file;

hash a second configuration file configuring a second optical scan machine to create a second cryptographic hash of the second configuration file; and load the first cryptographic hash of the first configuration file onto the central voting management server;

load the second cryptographic hash of the second configuration file onto the central voting management server; and compare, via the central voting management server, the first cryptographic hash of the first configuration file to the second cryptographic hash of the second configuration file.

Aspect 17. A computer system for error detection, the computer system comprising one or more processors configured to:

capture, with an optical scan machine, original image data;

isolate a first subimage of the original image data;

associate the first subimage with a first configuration file candidate, wherein the first configuration file candidate is indicated by a configuration file configuring the optical scan machine, and wherein the association is done according to the configuration file; and display the first subimage along with a representation of the first configuration file candidate.

Aspect 18. The system of claim 17, wherein the optical scan machine is a first optical scan machine, and the configuration file is a first configuration file, and wherein the one or more processors are further configured to:

hash the first configuration file to create a first cryptographic hash of the first configuration file;

hash a second configuration file configuring a second optical scan machine to create a second cryptographic hash of the second configuration file; and if the first configuration file matches the second configuration file, not capture second original image data with the second optical scan machine.

Aspect 19. The system of claim 17, wherein the one or more processors are configured to isolate the first subimage by:

identifying a first candidate name location in the original image data;

determining a location of the subimage based on the first candidate name location; and isolating the first subimage based upon the determined first candidate name location.

Aspect 20. The system of claim 17, wherein the one or more processors are configured to display the first subimage along with a representation of the configuration file candidate on: a display of the optical scan machine, and/or a display of an administrator computing device.

Aspect 21. A computer-implemented method for determining proper functioning of a voting system, the method comprising:

creating, via one or more processors, a first cryptographic hash of a first configuration file of a first optical scan machine;

creating, via one or more processors, a second cryptographic hash of a second configuration file of a second optical scan machine;

creating, via one or more processors, a third cryptographic hash of a third configuration file of a central voting management server; and comparing, via the one or more processors, all three of the first cryptographic hash, the second cryptographic hash, and the third cryptographic hash.

Other Matters

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations). A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

Upon reading this disclosure, those of skill in the art will appreciate still additional alternative structural and functional designs for the approaches described herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

It is therefore intended that the foregoing detailed description be regarded as illustrative rather than limiting, and that it be understood that it is the following claims, including all equivalents, that are intended to define the spirit and scope of this invention.

Furthermore, the patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed:

1. A computer-implemented method for error detection, the method comprising:
    capturing, with an optical scan machine, original image data;
    isolating, via one or more processors of the optical scan machine, a first subimage of the original image data;
    associating, via the one or more processors, the first subimage with a first configuration file candidate, wherein the first configuration file candidate is indicated by a configuration file configuring the optical scan machine, and wherein the associating is done according to the configuration file; and
    displaying, via the one or more processors, the first subimage along with a representation of the first configuration file candidate.

2. The computer-implemented method of claim 1, further comprising:
    prior to the capturing of the original image data: (i) marking a ballot with a first symbol in a first target area of the ballot, the first target area corresponding to a first ballot candidate, and (ii) feeding the marked ballot into the optical scan machine; and
    wherein the capturing the original image data comprises capturing the original image data of the marked ballot.

3. The computer-implemented method of claim 1, further comprising:
    isolating, via the one or more processors, a second subimage of the original image data;
    associating, via the one or more processors, the second subimage with a second configuration file candidate, wherein the second configuration file candidate is indicated by the configuration file configuring the optical scan machine, and wherein the associating is done according to the configuration file; and
    displaying the second subimage along with a representation of the second configuration file candidate.

4. The computer-implemented method of claim 1, wherein the configuration file indicates a predetermined location of an expected ballot checkbox, and wherein the isolating the first subimage comprises isolating the first subimage according to the predetermined location of the expected ballot checkbox.

5. The computer-implemented method of claim 1, wherein the isolating the first subimage comprises:
    identifying a first candidate name location in the original image data;
    determining a location of the subimage based on the first candidate name location; and
    isolating the first subimage based upon the determined first candidate name location.

6. The computer-implemented method of claim 1, wherein the displaying comprises displaying the first subimage along with a representation of the configuration file candidate on: a display of the optical scan machine, and/or a display of an administrator computing device.

7. The computer-implemented method of claim 1, wherein the optical scan machine is a first optical scan machine, and the configuration file is a first configuration file, and wherein the method further comprises:
    hashing the first configuration file to create a first cryptographic hash of the first configuration file;
    hashing a second configuration file configuring a second optical scan machine to create a second cryptographic hash of the second configuration file; and
    comparing the first cryptographic hash of the first configuration file to the second cryptographic hash of the second configuration file.

8. The computer-implemented method of claim 7, further comprising:
    loading the first cryptographic hash of the first configuration file onto a central voting management server; and
    loading the second cryptographic hash of the second configuration file onto the central voting management server; and
    wherein the comparing the first cryptographic hash of the first configuration file to the second cryptographic hash of the second configuration file is performed by one or more processors of the central voting management server.

9. The computer-implemented method of claim 7, further comprising:
    determining that the first configuration file matches the second configuration file based on the comparing the first cryptographic hash of the first configuration file to the second cryptographic hash of the second configuration file; and
    in response to the determining that the first configuration file matches the second configuration file, not capturing second original image data with the second optical scan machine.

10. The computer-implemented method of claim 1, further comprising:
    prior to the capturing the original image data, hashing the first configuration file to create an initial cryptographic hash of the first configuration file;
    subsequent to the displaying the first subimage along with a representation of the first configuration file candidate, hashing the first configuration file to create a subsequent cryptographic hash of the first configuration file; and
    comparing the initial cryptographic hash to the subsequent cryptographic hash.

11. The computer-implemented method of claim 1, wherein the configuration file is an optical scan machine configuration file, and wherein the method further comprises:
    hashing the optical scan machine configuration file to create an optical scan machine cryptographic hash of the optical scan machine configuration file;
    hashing a central voting management server configuration file configuring a central voting management server to create a central voting management server cryptographic hash of the central voting management server configuration file; and comparing the optical scan machine cryptographic hash of the optical scan machine configuration file to the central voting management server cryptographic hash of the central voting management server configuration file.

12. The computer-implemented method of claim 1, wherein:
the method further comprises, prior to the capturing of the original image data: (i) marking a ballot with at least one edge mark in a first target area of the ballot, the first target area corresponding to a first ballot candidate, and (ii) feeding the marked ballot into the optical scan machine;
the capturing the original image data comprises capturing the original image data of the marked ballot; and
checking an alignment of the optical scan machine based on a representation of the at least one edge mark in the first subimage.

13. A system for error detection, the system comprising:
one or more processors; and
one or more memories;
the one or more memories having stored thereon computer-executable instructions that, when executed by the one or more processors, cause the system to:
capture, with an optical scan machine, original image data;
isolate a first subimage of the original image data;
associate the first subimage with a first configuration file candidate, wherein the first configuration file candidate is indicated by a configuration file configuring the optical scan machine, and wherein the association is done according to the configuration file; and
print the first subimage along with a representation of the first configuration file candidate.

14. The system of claim 13, wherein:
the one or more processors are one or more processors of an optical scan machine;
the system further comprises a printer; and
the one or more memories having stored thereon computer executable instructions that, when executed by the one or more processors, cause the system to print the first subimage along with a representation of the first configuration file candidate by sending printing instructions from the one or more processors to the printer.

15. The system of claim 13, wherein the optical scan machine is a first optical scan machine, and the configuration file is a first configuration file, and wherein the one or more memories having stored thereon computer executable instructions that, when executed by the one or more processors, cause the system to:
hash the first configuration file to create a first cryptographic hash of the first configuration file;
hash a second configuration file configuring a second optical scan machine to create a second cryptographic hash of the second configuration file; and
if the first configuration file matches the second configuration file, not capture second original image data with the second optical scan machine.

16. The system of claim 13, further comprising a central voting management server, and wherein the one or more memories having stored thereon computer executable instructions that, when executed by the one or more processors, cause the system to:
hash the first configuration file to create a first cryptographic hash of the first configuration file;
hash a second configuration file configuring a second optical scan machine to create a second cryptographic hash of the second configuration file; and
load the first cryptographic hash of the first configuration file onto the central voting management server;
load the second cryptographic hash of the second configuration file onto the central voting management server; and
compare, via the central voting management server, the first cryptographic hash of the first configuration file to the second cryptographic hash of the second configuration file.

17. A computer system for error detection, the computer system comprising one or more processors configured to:
capture, with an optical scan machine, original image data;
isolate a first subimage of the original image data;
associate the first subimage with a first configuration file candidate, wherein the first configuration file candidate is indicated by a configuration file configuring the optical scan machine, and wherein the association is done according to the configuration file; and
display the first subimage along with a representation of the first configuration file candidate.

18. The system of claim 17, wherein the optical scan machine is a first optical scan machine, and the configuration file is a first configuration file, and wherein the one or more processors are further configured to:
hash the first configuration file to create a first cryptographic hash of the first configuration file;
hash a second configuration file configuring a second optical scan machine to create a second cryptographic hash of the second configuration file; and
if the first configuration file matches the second configuration file, not capture second original image data with the second optical scan machine.

19. The system of claim 17, wherein the one or more processors are configured to isolate the first subimage by:
identifying a first candidate name location in the original image data;
determining a location of the subimage based on the first candidate name location; and
isolating the first subimage based upon the determined first candidate name location.

20. The system of claim 17, wherein the one or more processors are configured to display the first subimage along with a representation of the configuration file candidate on: a display of the optical scan machine, and/or a display of an administrator computing device.

* * * * *